UNITED STATES PATENT OFFICE.

PAUL TUST, OF VOHWINKEL, NEAR ELBERFELD, GERMANY, ASSIGNOR TO SYNTHETIC PATENTS CO., INC., OF NEW YORK, N. Y., A CORPORATION OF NEW YORK.

ALUMINA COLOR-LAKES.

1,126,591.  Specification of Letters Patent.  Patented Jan. 26, 1915.

No Drawing.  Application filed July 7, 1914.  Serial No. 849,382.

*To all whom it may concern:*

Be it known that I, PAUL TUST, chemist, citizen of the German Empire, residing at Vohwinkel, near Elberfeld, Germany, have invented new and useful Improvements in Alumina Color-Lakes, of which the following is a specification.

I have found that the 1.4-dioxyanthraquinone sulfonic acids, such as

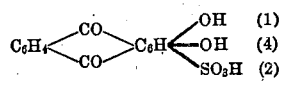

or

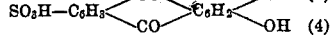

yield valuable pigments or lakes when treated with alumina as substratum. The new lakes have a valuable clear bluish-red shade and are fast to light.

In order to illustrate the new process more fully the following examples are given, the parts being by weight:

Example 1: 5 parts of 1.4-dioxyanthraquinone-2-sulfonic acid are while being hot dissolved in 10 to 15 times the quantity of water and boiled with 1,000 parts of a solution (1:10) of aluminium sulfate (18 per cent.), then the aluminium lake is precipitated by addition of 40 parts of calcined sodium carbonate dissolved in 400 parts of water, filtered off, washed and dried.

In order to form size colors 1,000 parts of a solution of barium chlorid (1:10) can be added.

Example 2: 3 parts of 1.4-dioxyanthraquinone-5-sulfonic acid are while being hot dissolved in 10 to 15 times the quantity of water and boiled for half an hour with aluminium hydrate (10 per cent. paste), filtered off, washed and dried.

In order to form a lake containing also barium before boiling 30 parts of a solution of barium chlorid (1:10) are added.

Any other method for producing pigments or lakes can be used.

I claim:—

1. The new red alumina color lakes prepared from 1.4-dioxyanthraquinone sulfonic acids and containing aluminium, said lakes being distinguished by their valuable bluish-red shade and their fastness to light, substantially as described.

2. The new red alumina color lake prepared from 1.4-dioxyanthraquinone-2-sulfonic acid and containing aluminium, said lake being distinguished by its valuable bluish-red shades and its fastness to light, substantially as described.

In testimony whereof I have hereunto set my hand in the presence of two subscribing witnesses.

PAUL TUST. [L. S.]

Witnesses:
 HELEN NUFER,
 FRANCES NUFER.